United States Patent [19]

Allen et al.

[11] Patent Number: 4,487,584

[45] Date of Patent: Dec. 11, 1984

[54] RASTER SHIFTING DELAY COMPENSATION SYSTEM

[75] Inventors: John H. Allen, Orlando; Joseph Portoghese, Altamonte Springs; Richard C. Hebb, Orlando; Denis R. Breglia, Altamonte Springs, all of Fla.

[73] Assignee: The United States of America as represented by the Secretary of the Navy, Washington, D.C.

[21] Appl. No.: 442,410

[22] Filed: Nov. 17, 1982

[51] Int. Cl.³ .................................................. G09B 9/00
[52] U.S. Cl. ........................................ 434/44; 358/104
[58] Field of Search ...................... 434/43, 44; 358/104

[56] References Cited

U.S. PATENT DOCUMENTS

| | | | |
|---|---|---|---|
| 4,048,653 | 9/1977 | Spooner | 434/44 |
| 4,315,240 | 2/1982 | Spooner | 434/44 |
| 4,315,241 | 2/1982 | Spooner | 434/44 |
| 4,340,878 | 7/1982 | Spooner | 434/44 |
| 4,347,507 | 8/1982 | Spooner | 434/44 |
| 4,347,508 | 8/1982 | Spooner | 434/44 |
| 4,349,815 | 9/1982 | Spooner | 434/44 |

Primary Examiner—Richard C. Pinkham
Assistant Examiner—Leo P. Picard
Attorney, Agent, or Firm—Robert F. Beers; Robert W. Adams

[57] ABSTRACT

A compensation system for use in a helmet mounted raster projection system utilizes a microprocessor to control the offset position of the raster line and frame scanners, thereby increasing the stability of the viewed scene. The microprocessor calculates control words which are fed to the scanners via digital to analog converters during the vertical sync of the raster scan. The microprocessor calculates the control words from pilot look data obtained by head and eye trackers compared to previous similar data.

14 Claims, 5 Drawing Figures

INHERENT DELAY IN HELMENT MOUNTED DISPLAY WITH CIG.

RASTER SHIFTING DELAY COMPENSATION SYSTEM

BACKGROUND OF THE INVENTION

1. Field of the Invention

The present invention relates to wide angle video display apparatus. In particular, the present invention relates to display apparatus wherein a visual scene is projected onto a retroreflective surface from a helmet mounted raster type projector. In even greater particularity, the present invention may be characterized as a rapid head movement compensation device for offsetting a raster scan during movement of the projector.

2. Description of the Prior Art

Simulator devices for pilots and vehicle operators have always been lacking in dynamic presentation of visual input to the trainee, particularly where wide angle displays are concerned. The best current approaches for wide angle displays involve the use of multiple computer generated imagery channels and associated projection equipment to provide imagery for individual parts of the viewing area. These individual fields of view or windows are butted together to form a continuous wide angle display. Obviously such a display requires substantial investment in material and maintenance.

A way to reduce the economic impact by reducing the number of CIG channels and associated projection equipment is to project video imagery from the viewer's helmet onto a large spherical dome screen of retroreflective material. Positional outputs from head and eye trackers are used to determine the viewer's look direction and the CIG system provides images in accordance with the determined outputs.

As an added benefit, mounting the projector on the helmet of the viewer reduces perspective distortion by locating the projector exit pupil close to the eye of the viewer, thereby decreasing the software and hardware development required to correct for the distortion, and correspondingly reducing the image computation time associated with distortion correction.

Unfortunately, there are time delays associated with both the determination of the viewer's look direction and the subsequent mathematical modeling of the image for projection by the CIG system. Using a 60 Hertz CIG update rate, it can be expected that the projected image will lag the motion by at least 85 to 90 milliseconds, thus the details of the viewed image will appear to swim or reposition themselves at the end of a head movement. The effect of having stationary objects, such as trees, appear to jump obviously detracts from the training effort.

SUMMARY OF THE INVENTION

It is an object of the present invention to provide a stabilized CIG display for a helmet mounted projector, by compensating for head movement.

It is a further object of the present invention to maintain individual objects within a display in their fixed positions.

These and other objects are met by rapid head motion compensation hardware which, under the control of a microprocessor, moves the imaging raster in such a manner as to keep objects in the field of view from moving as the pilot changes his look direction. The compensation is based on the most recent pilot look direction (PLD) obtained from PLD sensors compared with the PLD used to compute the image to be displayed next. The difference between these PLD's is utilized by the microprocessor to generate instructions to the raster shifting hardware to shift the projected imagery opposite the direction of head motion.

The features of the invention desired to be protected are set forth in the appended claims. The invention itself, together with further objects and advantages thereof may best be understood by referring to the following description taken in conjunction with the appended drawings.

DESCRIPTION OF A PREFERRED EMBODIMENT

The helmet mounted display system (HMD) to which the present invention relates relies on the use of computer image generation (CIG). During flight simulation, the pilot flies through the computer generated imagery and scenery is presented in response to his head direction and aircraft movement. The imagery provided is continuously updated via CIG in order to respond to changes in the view window corresponding to pilot look direction (PLD) and movement of the aircraft.

Figure 1:
FIG. 1 depicts the time delay of the processing equipment in terms of fields.

The CIG updates the visual presentation at a 60 Hertz rate or equivalently at a field rate. Unfortunately, the processing time required to generate each new field is much longer than a field time; typically it takes three fields or some 50 milliseconds to process a single field. Obviously, it takes another field to display the processed field. This delay is depicted in Fig. 1, wherein each field is bounded by a vertical sync. Field 0 is used to gather pilot look direction and aircraft position data and transfer the data to CIG. Fields 1, 2, and 3 are expended in processing the image, and field 4 is the first display field. It should be noted that the CIG referred to is a G. E. Compuscene CIG, and some variations may exist with other CIG systems.

The environmental setting for the present invention is provided by a video system which utilizes a laser video projector for the display. The key to this display systems integration with the helmet is the forming of the video scan lines, 525 to 1023 lines per frame, remote from the helmet, and subsequent frame scanning of the raster after the line scan is relayed to the helmet by a fiber optics means. At the helmet, the raster lines encounter a projection lens and a scanner which frame scans the horizontal raster lines, which are projected onto the interior of a retroreflective dome. In the developmental model, line scanning is accomplished with an acoustic optic beam deflector and frame scanning is accomplished with a closed loop moving iron galvanometer mirror scanner; however, the present invention may be employed with different line and frame scan means.

Figure 2:
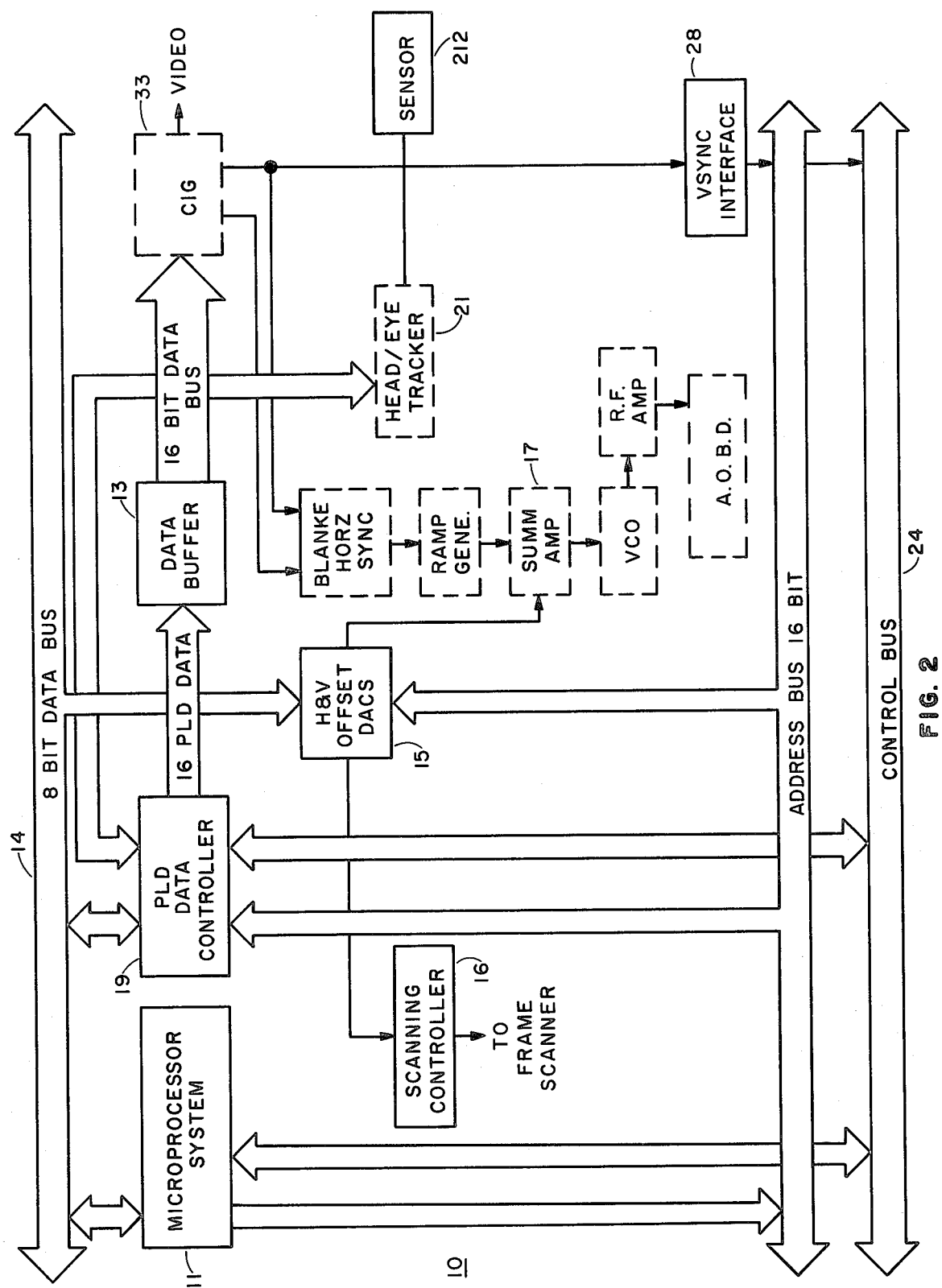
FIG. 2 is a block diagram of the invention with the associated projection equipment.

The present invention was devised to solve the problem created by the image displacement during head motions due to the time required to sense the PLD data and process the new display scene. Referring to FIG. 2, compensation system 10 relies on a microprocessor system 11 to control the relative projection angle of the imagery from the viewer's helmet in response to an image displacement error calcuated from successive measurements of pilot look direction (PLD). Changes in the image projection direction are accomplished via an interface into the vertical and horizontal ramp sections of the laser video projection system.

Compensation system 10 is programmed to perform two functions: to keep a record of past PLD values obtained via PLD data controller 19 from head/eye tracker 21 and then to calculate the required amount of raster shifting for proper image placement; and to load data buffers 13 for the transfer of PLD data to the CIG 33. For the raster shifting function, microprocesor system 11 must calculate two 8-bit words to be sent to the digital to analog converters (DAC's) 15 which supply the raster offset to a frame scanning controller 16 and a summing amplifier 17. The 8-bit words for raster displacement are communicated by bus 14.

The horizontal shift value to be calculated is dependent on the target plane raster size, the projection lens, and tthe reference voltage for DAC 15. The horizontal shift value for the laser based helmet mounted display system is calculated according to the focal length of the lens and the required displacement of the raster to effect an angular shift of the projected image to offset the change in PLD.

To find the scale factor for the horizontal channel, in the prototype, the 8-bit word required to displace the raster line one quarter of its length was experimentally determined to be 32 hex or 50 decimal. Knowing the focal length of the projection lens (15 mm), and the raster length (8 mm) at the target plane, an offset of 32 hex results in a 7.6 degree shift of the projected imagery.

The vertical shift value, however, is not dependent on the projection lens or the raster size, inasmuch as the angular shifting of the image in the vertical direction is accomplished by offsetting the central positioning of the frame scanning mirror, which is optically subsequent to the projection lens.

Sometime just before or during the pending vertical sync, microprocessor system 11 finishes calculating the two 8-bit words representing the horizontal and vertical raster shifts. Then the system enters a loop and waits for the next occurrence of vertical sync input from CIG 33 via a vertical sync interface 28. When vertical sync occurs, microprocessor system 11 responds by outputting the two 8-bit words to the horizontal and vertical digital to analog converters 15. The voltge output of DAC's 15 controls the extent of the raster shift required. Shifting the raster is done only during the vertical retrace time, i.e., during the vertical sync. By introducing a shift during the time that the video is blanked, the whole raster is shifted as a unit and tearing or separation of the displayed raster is avoided.

For microprocessor system 11, an Intel SDK-85 development board was used in the prototype because it provides a ready-made micro system at a reasonable cost. Provided are random access memory and erasable programmable memory (EPROM) which is used for program storage. The microprocessor itself is an Intel 8085A in the prototype, and is in communication with horizontal and vertical digital to analog converters 15 and a vertical sync interface 28 which provides the sync pulse for both head/eye tracker 21 and microprocessor system 11 via control bus 24. Microprocessor system 11 also is in communication with PLD data controller 19 which allows data transfer from tracker 21 to microprocessor system 11. A data buffer 13 communicating with controller 19 allows CIG 33 to take in PLD data transparent to the operation of microprocessor system 11.

Figure 3:
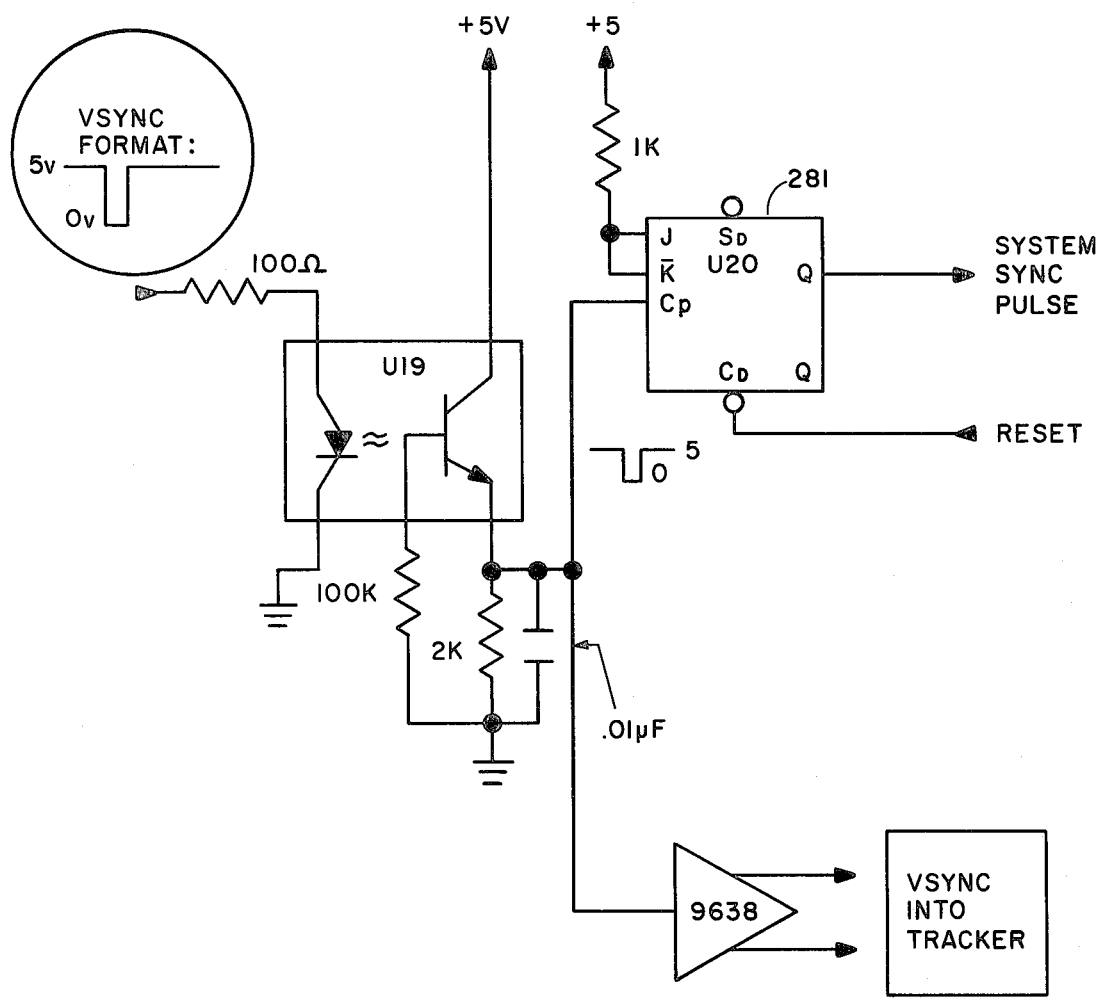
FIG. 3 shows a schematic of the Vsync interface.

FIG. 3 depicts a vertical sync interface that may be used in the system. The interface utilizes a state device 281 triggered by the vertical sync from the associated CIG to output a synchronization pulse, or interrupt, to microprocessor system 11 and data controller 19 via control bus 24. Interface 28 sends the sync to tracker 21 independently and receives a reset pulse at state device 281 from controller 19.

Figure 4:
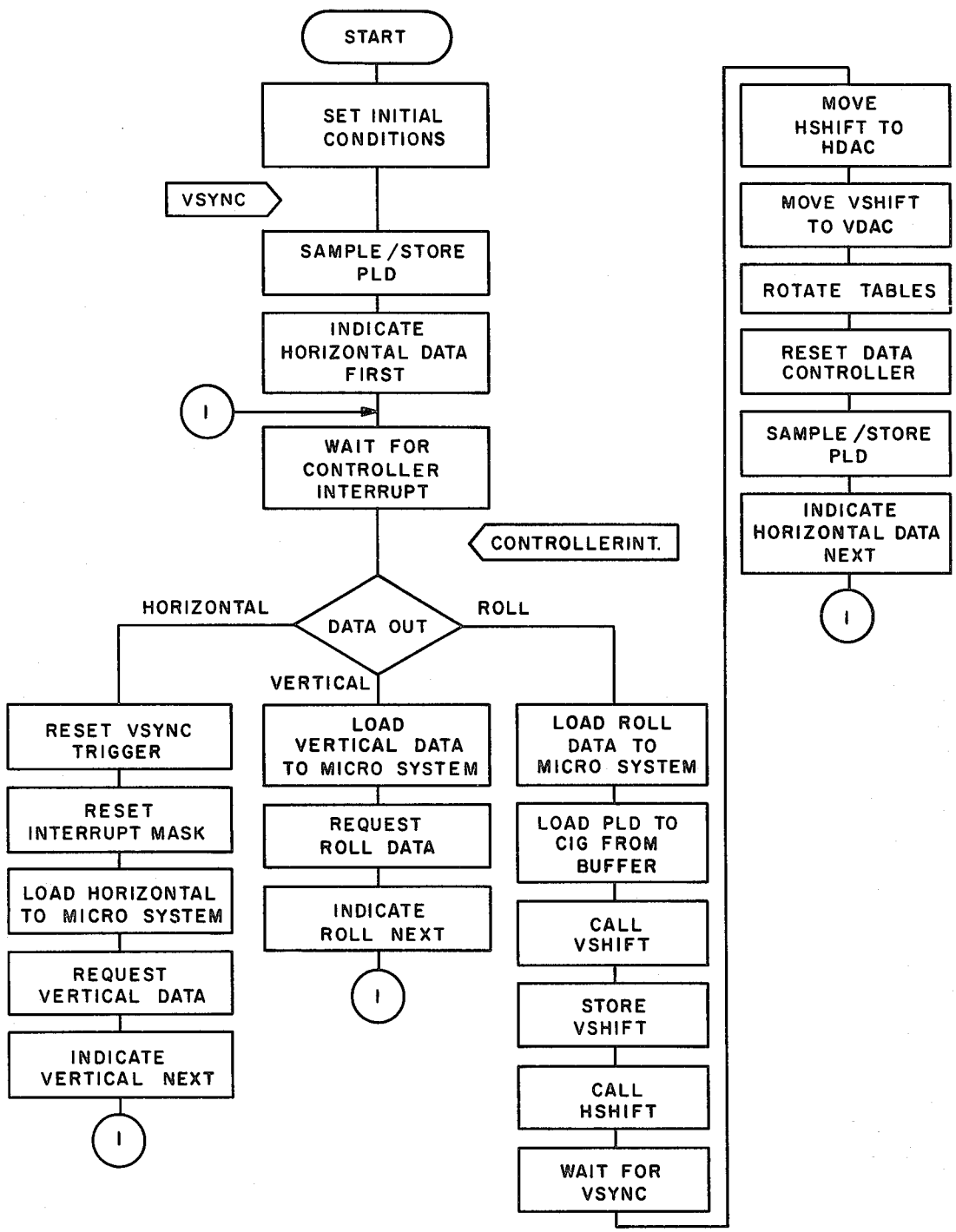
FIG. 4 is a flow chart of the process undertaken by the invention.

The operation of the system may best be understood by referring to the flow chart depicted in FIG. 4, which is indicative of the process required with the particular environment of the prototype model.

In the prototype system there are two interrupts: one from the vertical sync generated by the CIG and one from controller 19 indicating data ready. Three types of data are transferred from tracker 21, horizontal displacement, vertical displacement, and roll displacement.

As can be seen from FIG. 4, the scheme employed by the compensation system is essentially a double loop process for collecting data, generating control signals and outputting the same to the proper channels. Referring to FIG. 4, the system is set to a ready state. The first loop in the process involves the transfer of horizontal, vertical, and roll data from head/eye tracker 21 to microprocessor system 11 via PLD data controller 19. The operation and structure of controller 19 is set forth in U.S. patent application Ser. No. 275,564, filed June 22, 1981 by John H. Allen.

In the prototype, only head tracking using a Polhemus Head Tracker, Model No. SHMS III-A was input. The vertical sync from the CIG is used to start the data collection of head/eye tracker 21. About 15.5μ sec after the vertical sync, tracker 21 indicates that the position data is ready by a "data ready" pulse to controller 19, which responds with a "data acknowledge" pulse. The orientation and positional data is then ready to be clocked out of the tracker 21 and the first 17 bit word, "yaw", is clocked into dual, 10-bit, serial in parallel out shift registers in controller 19. The first 16 bits of the 17-bit word is transferred to dual 8-bit data buffers, also integral to controller 19, which when full send an interrupt to microprocessor system 11. Upon receipt of the interrupt, microprocessor system 11 addresses the buffers and pulls the horizontal data into memory for future processing. Microprocessor system 11 then requests the vertical data and the second branch of the flow chart shown in FIG. 4 is iterated. Controller 19 then clocks in the roll data and upon receiving the interrupt, microprocessor system 11 pulls in the roll data.

When the three data words have been received by microprocessor system 11, the "data acknowledge" is cleared and system 11 begins the computation cycle which determines the 8-bit values Vshift and Hshift which are sent to vertical and horizontal DAC's 15 during the subsequent vertical sync, which restarts the entire process. Vshift and Hshift are computed, as previously mentioned, by comparing the present positional data sample with a previous sample. In the exemplary system, two tables in Random Access Memory in microprocessor system 11 were used for storage of past and present vertical and horizontal data. The most recent data is placed at the top and moved sequentially down the table as new PLD data is obtained until the data is no longer needed and discarded.

The length of the tables determines the number of PLD values to be stored, and at the same time implies the number of field time delays for which the system will compensate. In the exemplary system, with a five field delay in tracker and CIG presentation, the tables must store the five previous PLD samples plus the present sample.

Both CIG 33 and compensation system 10 require PLD data every field. Data buffer 13 allows the CIG to take in PLD data relatively independent of the operation of compensation system 10. Basically, data buffer 13 counts the number of interrupts sent to microprocessor system 11 by controller 19 and loads one of three 16-bit buffers 131–133, not shown, on the rising edge of each interrupt. Input to data buffer 13 is from the output of the shift registers of controller 19. When buffers 131 to 133 have been loaded, a data ready word is sent to CIG 33 indicating a complete set of data is ready to be transferred. Azimuth, elevation, and roll are then sequentially transferred to CIG 33 and data buffer 13 is cleared for another set of PLD data.

Figure 5:
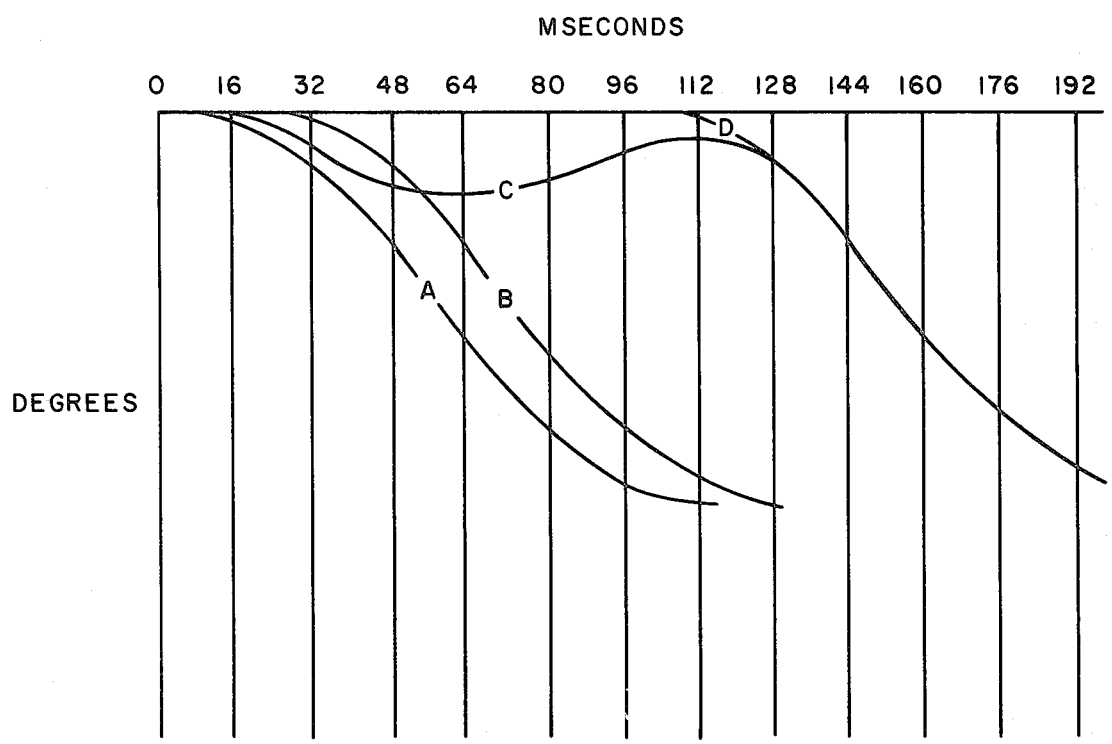
FIG. 5 illustrates the timing sequence for the compensation system.

FIG. 5 shows the timing sequence for the compensation system 10. This figure involves the relationship between the pilot's head motion, the delayed output of CIG 33, the delayed output of tracker 21, and the effect of the compensation system on the apparatus. Line A represents actual head movement, thus is indicative of the heading of the projector. Line B represents the tracker output and indicates the image lag associated with the tracker. Line C represents the projected image heading resulting from the operation of compensation system 10. Line D represents the angular heading for which the image being displayed is calculated.

The vertical separation of lines A and D in FIG. 5 represents the error in image placement without compensation system 10. The vertical separation between lines C and D represents the error in image placement using compensation system 10. It is apparent from FIG. 5 that although there may be some error in placement during rapid head motion, the error in placement of objects at the end of head motion is minimized.

Obviously, many modifications and variations of the present invention are possible in light of the above teachings. It is, therefore, to be understood that within the scope of the appended claims the invention may be practiced otherwise than as specifically described.

What is claimed is:

1. An apparatus for compensating for angular displacement of a visual scene from a helmet mounted projector, said projector utilizing a raster scan having distinct vertical and horizontal scan means to project said visual scene generated by a computer image generator in accordance with positional data output by a pilot look direction tracker, comprising in combination:

means for interfacing with said tracker to receive positional data therefrom, said interfacing means having storage capacity for said data and output for said data, means for determining compensatory angular displacement values based on iterative comparisons of said positional data, including a microprocessor, operably connected to receive data from said interfacing means and to output said displacement values, said microprocessor having inputs for receiving instructions, memory means containing instructions for said microprocessor operably connected thereto for providing thereto said instructions, and memory means for storage of positional data and initial condition data for processing by said microprocessor operably connected thereto for providing said data to said microprocessor;

means for inputting displacement values into said horizontal and vertical scan means operably connected to receive said values from said determining means;

means for inputting said positional data to said CIG operably connected to said interface means; and means for synchronizing said value input means with said CIG, thereby presenting continuous display operably connected to said CIG data input means, value input means, said determining means, said interface means, and said tracker.

2. The apparatus of claim 1, wherein said interfacing means comprises a serial to parallel interface receiving serial data from said tracker and outputting parallel data to said determining means and said CIG input means.

3. The apparatus of claim 1, wherein said means for inputting displacement values comprises:

a first digital to analog converter inputting said displacement value into said horizontal scan means; and a second digital to analog converter inputting said displacement value into said vertical scan means; and bus means operably connecting said first and second DAC to said interfacing means.

4. The apparatus of claim 1, wherein said CIG data inputting means comprises data buffer means operably connected to said interface means to receive data therefrom transparent to the operation of said determining means.

5. The apparatus of claim 1, wherein said CIG data inputting means comprises data buffer means receiving positional data input from said interfacing means, transparent to the operation of said determining means, and outputting positional data to said CIG.

6. An apparatus for compensating for angular displacement of a visual scene from a helmet mounted projector, said projector utilizing a raster scan having distinct vertical and horizontal scan means to project said visual scene generated by a computer image generator in accordance with positional data output by a pilot look direction tracker, comprising in combination:

means for interfacing with said tracker to receive positional data therefrom, said interfacing means having storage capacity for said data and output for said data;

means for determining compensatory angular displacement values based on said positional data, said determining means operably connected to receive data from said interfacing means, and outputting said displacement values, including a microprocessor, operably connected to receive data from said interfacing means and to output data, as displacement values, said microprocessor having inputs for receiving instructions, memory means containing instructions for said microprocessor operably connected thereto for inputting said instructions, and memory means for storage of positional data and initial condition data for processing by said microprocessor operably connected thereto for providing said data to said microprocessor;

means for inputting displacement values into said horizontal and vertical scan means operably connected to receive said values from said determining means, including a first digital to analog converter inputting said displacement value into said horizontal scan means, a second digital to analog converter inputting said displacement value into said vertical scan means, and bus means operably connecting said first and second DAC to said interfacing means;

means for inputting said positional data to said CIG operably connected to said interface means, including data buffer means receiving positional data input from said interfacing means, transparent to the operation of said determining means, and outputting positional data to said CIG; and means for synchronizing said value input means with said CIG, thereby presenting continuous display operably connected to said CIG data input means, value input means, said determining means, said interface means, and said tracker.

7. A method of compensating, under microprocessor control, for angular displacement of a visual scene due to processing delays in a projection system utilizing a helmet mounted projector to display a raster scan image generated by a computer generated imaging system in accordance with positional data supplied by a pilot look direction tracking unit, comprising the steps of:

aligning said helmet mounted projector's axis of projection for zero offset;

iteratively sampling head position data by said tracking unit during each field of said raster scan;

outputting serial data corresponding to said head position data from said tracker;

converting said serial data to parallel data;

storing said position data in a memory table;

comparing the most recent head position data with preselected position data stored in said memory from a previous field to determine changes in head position;

computing of set values for said raster projection axis for compensating for said head motion;

sending head position data to said CIG during each field;

varying said raster projection axis in accordance with said offset values; and synchronizing the above steps such that said raster offset is varied during a raster return time whereby said visual presentation is not disrupted.

8. The method of claim 7, wherein said sampling step comprises:

sampling vertical head position data;
sampling horizontal head position data; and
sampling roll head position data.

9. The method of claim 8, wherein said sampling step further comprises sampling the eye position of the pilot.

10. The method of claim 9, wherein said outputting step comprises:

indicating that said sampling step has been completed;

transferring data obtained in said sampling step in serial format to storage devices;

indicating when said transfer of data is complete; and resetting said tracking unit for a subsequent sampling iteration during the next field of said raster scan.

11. The method of claim 10, wherein said storing step comprises:

transferring said vertical head position data to said microprocessor in parallel format;

transferring said horizontal head position data to said microprocessor in parallel format; and transferring said roll head position to said microprocessor in parallel format.

12. The method of claim 11, wherein said sending step further comprises the steps of:

transferring said vertical, horizontal and roll position data to a buffer means simultaneously with said transfer to said microprocessor;

counting the number of data transfers to said microprocessor to determine when all data from a field has been transferred to said buffer means;

sequentially outputting said vertical, horizontal, and roll head position data to said CIG; and resetting said buffer means to accept data during the succeeding field.

13. The method of claim 8, wherein said outputting step comprises:

indicating head position data has been sampled;

transferring said data in serial format to storage devices;

indicating said transfer complete; and resetting said tracking unit for a subsequent sampling iteration during the next field of said raster scan.

14. The method of claim 7, wherein said comparing step utilizes a predetermined position data stored in a memory table said data having been stored during a previous field temporaly separated by the system delay which is being compensated for.

* * * * *